(12) United States Patent  (10) Patent No.: US 8,024,480 B2
DiStefano  (45) Date of Patent: Sep. 20, 2011

(54) COMPLEX EVENT PROCESSING CLOUD

(76) Inventor: Michael Vincent DiStefano, Martinsville, NJ (US)

(*) Notice: Subject to any disclaimer, the term of this patent is extended or adjusted under 35 U.S.C. 154(b) by 401 days.

(21) Appl. No.: 12/150,305

(22) Filed: Apr. 28, 2008

(65) Prior Publication Data

US 2009/0271468 A1  Oct. 29, 2009

(51) Int. Cl.
*G06F 15/173* (2006.01)
(52) U.S. Cl. ........ 709/244; 709/201; 709/205; 707/770; 717/127
(58) Field of Classification Search .................. 709/244
See application file for complete search history.

(56) References Cited

U.S. PATENT DOCUMENTS

| | | | |
|---|---|---|---|
| 2006/0229923 A1* | 10/2006 | Adi et al. | 705/8 |
| 2007/0118545 A1* | 5/2007 | Chandrasekharan et al. | 707/101 |
| 2007/0168990 A1* | 7/2007 | Alshab et al. | 717/127 |
| 2009/0064323 A1* | 3/2009 | Lin | 707/101 |
| 2009/0171999 A1* | 7/2009 | McColl et al. | 707/101 |

* cited by examiner

*Primary Examiner* — Dohm Chankong
*Assistant Examiner* — Neeraj Utreja
(74) *Attorney, Agent, or Firm* — Kilpatrick Townsend & Stockton LLP

(57) ABSTRACT

A distributed system of CEP Services hosted by a CEP Cloud where the CEP Cloud is composed of a network of CEP Engines connected by an IPC Protocol is provided. CEP Services interact with each other via a series of Event Streams transported by an IPC protocol between one or multiple CEP Services. CEP Services have no theoretical limit to the number of CEP Engines that compose said services.

7 Claims, 7 Drawing Sheets

Input Service Request are Naturally and Physically split
or Partitioned by Event Sources Input Service Request are Partitioned by IPC Transport

COMPLEX EVENT PROCESSING CLOUD

FIELD OF THE INVENTION

The present invention relates to establishing complex event processing (CEP) environments and, more particularly, to establishing a loosely coupled network of individual CEP engines that act as a virtual CEP engine.

BACKGROUND OF THE INVENTION

Definition of terms used in this discussion, Complex Event Processing (CEP) and CEP Engines, are described below.

CEP is an event processing concept that processes multiple events of an event stream with the goal of identifying the meaningful events within the event stream. CEP employs techniques such as detection of complex patterns of many events, event correlation and abstraction, event hierarchies, and relationships between events such as causality, membership, and timing, and event-driven processes.

A Complex Event Processing Engine is a process executing in a program space that consumes event streams for the purpose of performing the objectives of CEP as described above. Examples of Open Source CEP Engines are Esper (http://esper.codehaus.org/) while commercially available CEP Engines are available from StreamBase (http://www.streambase.com/complex-event-processing.htm), and Progress Apama (http://www.progress.com/apama/products/apama_esp/index.ssp).

Simply by sheer volume of data, Event Streams from either a single or multiple of event sources can out strip the capacity of a CEP Engine. This creates a bottle neck in two areas, processing and networking. Processing capacity can only be elevated (even if only temporarily) by running the CEP Engine in a processor of greater capacity. Additional bottlenecks occur when managing event streams originating from multiple sources across a network. This puts great load on the network to transport the event streams to the CEP Engine that can consume large amounts of network bandwidth.

The CPU capacity bottleneck scales with advances of integrated circuit technology to deliver faster CPU chips and the financial budget available to continually upgrade to these new more powerful compute servers. The network bandwidth bottleneck has no such path to expansion. Unlike integrated circuit technology, network technologies do not advance in accordance with Moore's Law. And networking infrastructures are very costly and not so easily upgraded.

This puts a hard ceiling for CEP capacity and limits the use of this technology thus eliminating entire classes of applications that can benefit from it.

This invention describes engineering techniques and methodology that establishes a "Cloud" or "Virtual" CEP Engine that vastly extends the capacity and scope of the CEP Engine without consuming large amounts network bandwidth.

To date the solution to CEP Engine Capacity is to run these engines on exotic hardware platforms that enable the process to consume and evaluate larger event streams.

Listed below are 2 U.S. Pat. Nos. 7,243,124 and 7,272,660 both submitted by Oracle and are very close to each other in concept. Each describes methods for sharing the load for evaluating "components" of a rule across multiple CEP Engines as managed by a central manager. This is a very different method described with in this patent.

In the U.S. Pat. Nos. 7,243,124 and 7,272,660 a hub and spoke model is used with a single manager sharing its load with "helper" CEP Engines. The central manager is a single point of consumption of input data streams as well as the final correlation of events processed by its satellite CEP Engines. Therefore this method scales with the ability of the central CEP Manager to scale, ultimately the same techniques as current CEP Engines running it on a larger capacity server.

For completeness, prior patents discuss enhancing CEP performance is listed below. However, none of these are directly applicable to networking CEP Engines as described with in this patent. These are: Method and system for managing events (U.S. Pat. No. 7,289,988), Architecture for general purpose near real-time business intelligence system with client devices and methods (U.S. Pat. No. 7,243,124), and Architecture for general purpose near real-time business intelligence system and methods (U.S. Pat. No. 7,272,660)

The other solutions identified, all scale to the hard limit of: Processing power of the hardware (CPU Server) the CEP Engine is running on, and the internal processing efficiency of the CEP Engine software algorithms.

Advances in these respective areas can raise the limit; however it is still a hard limit that can not scale beyond the single running instance of a CEP Engine.

The invention put forth within is a method that opens the CEP scaling ceiling to the approximate cumulative limits of the individual CEP Engines running across the network. The resulting CEP Cloud has a limit defined in the following two fundamental ways. First and foremost, expanding the network of CEP Engines raises the overall processing limit.

Second are the advances available to each individual CEP Engine in the CEP Cloud. This is identical to that of the current solutions, advances in the processing power of the CPU and CEP internal processing algorithm. As each individual CEP Engine in the CEP Cloud increases in processing capability the Cloud processing capacity increases in proportion.

It is an object of the invention to create a CEP Cloud whose processing limits are solely bound by the number of CEP engines participating in the network of CEP engines that make up the CEP Cloud.

It is another object of the invention to establish CEP Services that perform specific end-user function. CEP Services are logical entities defined by function whose physical composition are any number of CEP Engines in the CEP Cloud.

It is another object of the invention to establish communication protocol of Event Streams that CEP Services interface to other CEP Services and external systems of the CEP Cloud.

It is another object of the invention to establish Event Stream relationships that are naturally formed as native event streams and derived event streams.

It is another object of the invention to establish CEP State Actions that are produced by CEP Services so to affect state of other CEP Services in the CEP Cloud as well as systems external to the CEP Cloud.

SUMMARY OF THE INVENTION

In accordance with the present invention, there is provided a means to establish a CEP Cloud with processing capabilities to scales as required by the business application or applications leveraging the CEP Cloud. Included is a method of establishing a network of CEP Engines that work in concert with each other so to provide the Service Level Agreements (SLA) of function, latency, and throughput as required by the application.

For the purposes of communicating this invention, well known computer science vocabulary is used such as "Services". At its core the events input to a CEP Engine will collectively either by them selves or in relation with previous events require "Actions" to be taken by the CEP Engine.

These actions are a direct cause-effect relationship where the cause is defined by a specific event or correlation of events in the input event stream. The effect is specific to the cause (as just described) so to perform the required function the application demands. These Actions either taken individually or in any combination define a CEP Service.

The CEP Cloud hosts logical CEP Services that are interconnected by an Inter-Process-Communication (IPC)-protocol. A single CEP Service may physically be composed of one or more CEP Engines in the CEP Cloud. As a matter of course, each CEP Engine in the Cloud is interconnected by the same IPC protocol as the CEP Services they themselves compose.

This present invention puts no requirement on the complexion of the CEP Engines or IPC Protocol that makeup the Cloud. The Cloud may be homogeneous in its physical CEP Engine composition; it may be heterogeneous in its composition. This is an implementation detail that this present invention yields to the implementer of the CEP Cloud. Similar implementation level detail is granted to the selection of IPC Protocol of the CEP Cloud. These are all implementation details that the implementer must take into consideration so to meet the SLAs of the CEP Cloud.

A CEP Service provides an application function that operates over one or multiple event streams. CEP Services may interact with each other so to provide a larger, overall service to the end user of the CEP Services. Therefore there is some level of coordination between the individual CEP Engines that compose a CEP Service and between the CEP Services themselves. The means of this coordination is itself an Event Stream. Events between CEP Engines and CEP Services of the CEP Cloud are transported via the IPC Protocol.

This invention puts no requirement on the IPC Protocol or the transports connecting CEP Engines nor does it put any requirement on the makeup of the CEP Engines composing the CEP Cloud. All may be of a single source or any combination of sources. The latter simply require a neutral event stream representation between CEP Engines without compromising the coordinating event stream itself.

Native Event Streams are the Event Streams which originate from external event sources to the CEP Cloud. The Coordinating Event Streams between CEP Services are Derived Events from the Base Event Streams. This Base and Derived Event Stream relationship offers the benefit of lower Derived Event Stream Throughput Levels as compared to the Base Event Stream. Therefore the network bandwidth requirement interconnecting the CEP Engines of the Cloud is low resulting in minimum network bandwidth utilization.

The result is a distributed system of CEP Services hosted by a CEP Cloud where the CEP Cloud is composed of a network of CEP Engines connected by an IPC Protocol. CEP Services interact with each other via a series of Event Streams between two or more CEP Services. CEP Services have no theoretical limit to the number of CEP Engines that compose said services while the definition of Event Streams interconnecting the CEP Services are bound by the bandwidth of the underlying network and IPC Protocol.

This unique combination forms is a CEP Cloud without bound to its processing limit.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

A CEP Cloud 16 is a virtualization of a CEP Engine. Employed in defining a CEP Cloud 16 are common Computer Design Patterns and terms such as services, interprocess communication (IPC) protocols, and distributed computing techniques sometimes referred to as a cluster, grid, or compute utility, etc.

Figure 1:
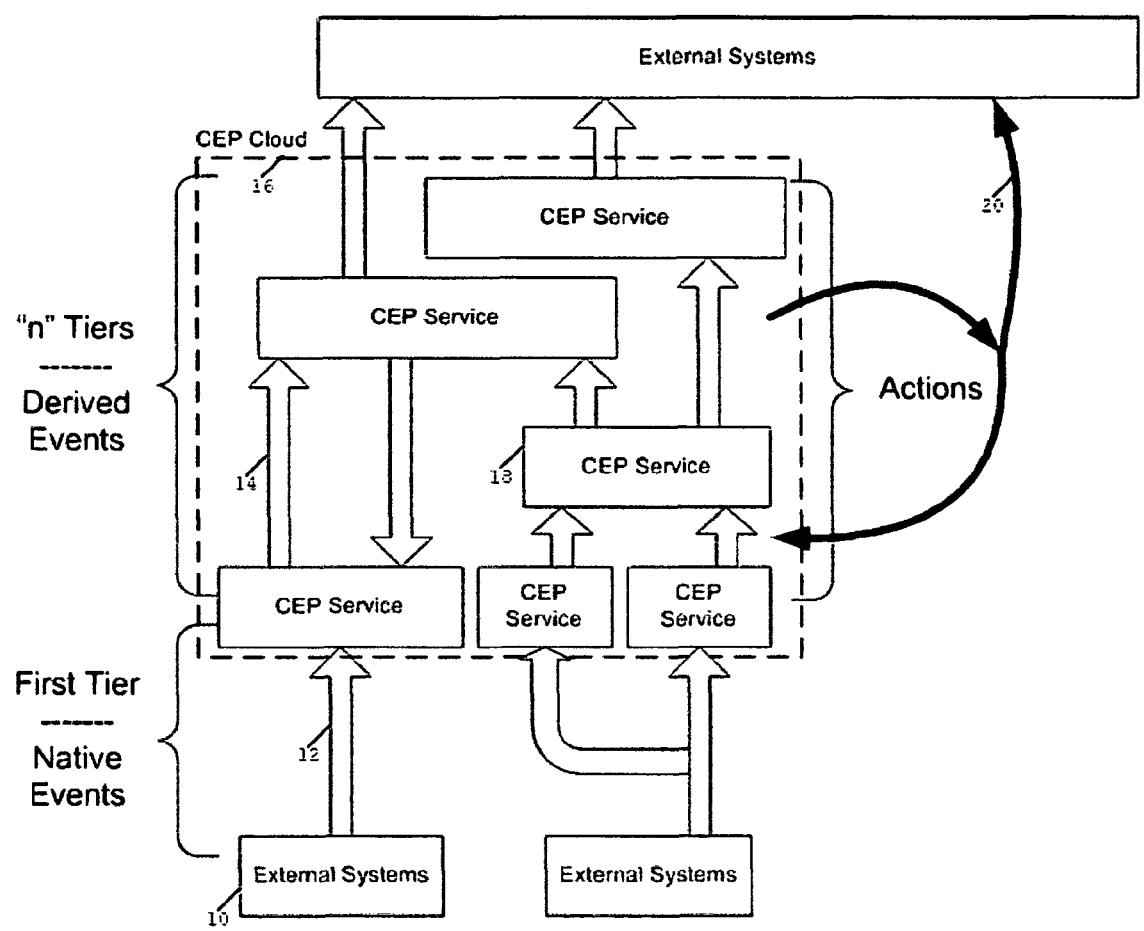
FIG. 1 is a block diagram view of an event action relationship in the CEP Cloud.

FIG. 1 is a view of the CEP Cloud 16. Shown are the functional components of the CEP Cloud 16 and their interactions. These components include:

CEP Cloud 16: a distributed system of interconnected CEP Engines that forms the foundation to support and provide CEP Services.

Event Streams 28: an infinite set of discrete events. Discrete events of the scope of this invention fall into two basic categories, Native Events 12 and Derived Events.

Native Events 12: Generated by a systems external to the CEP Cloud 16. These are the base events for all other derived events in the CEP Cloud 16

Derived Events 14: Are event streams 28 that are not Native Events 12. Typically these are CEP Service 18 and Application level events that add information and context to Native Events 12.

Actions 20: executable actions 20 generated by a CEP Service 18 that are invoked as a result of a single event or correlation of multiple events (native or derived) identifying a specific condition warranting the action to be taken. Action targets can be external systems 10 and CEP Services.

CEP Service 18: an entity that provides a logical application level service. Comprised of one or multiple CEP Engines of the CEP Cloud 16.

External Systems 10: are systems that the CEP Cloud 16 either (a) provides services for or, (b) interacts with to aid in providing services or, (c) affect the state of as a result of the services provided. Primary interactions between an External System are via Event Streams 28 and Action Targets.

As with the generally accepted definition of a software service (e.g. Service Oriented Architectures) a CEP Service 18 is a software service whose implementation is in part or entirely reliant on a CEP Engine. The purpose of this invention is to describe a methodology and process to scale a CEP Service 18 beyond the limitations of a single CEP Engine whose theoretical boundaries of scale and performance are that of the distributed compute environment composing the CEP Cloud 16.

A CEP Cloud 16 capable of hosting one or multiple CEP Services. The physical composition of the CEP Cloud 16 is a distributed compute environment. To date the common vocabulary describing and methods of implementing a distributed compute environment are compute cluster, grid, utility service, etc. It is fundamentally a physical network of computers and virtualization software that combine to create a virtual compute utility.

Figure 2:
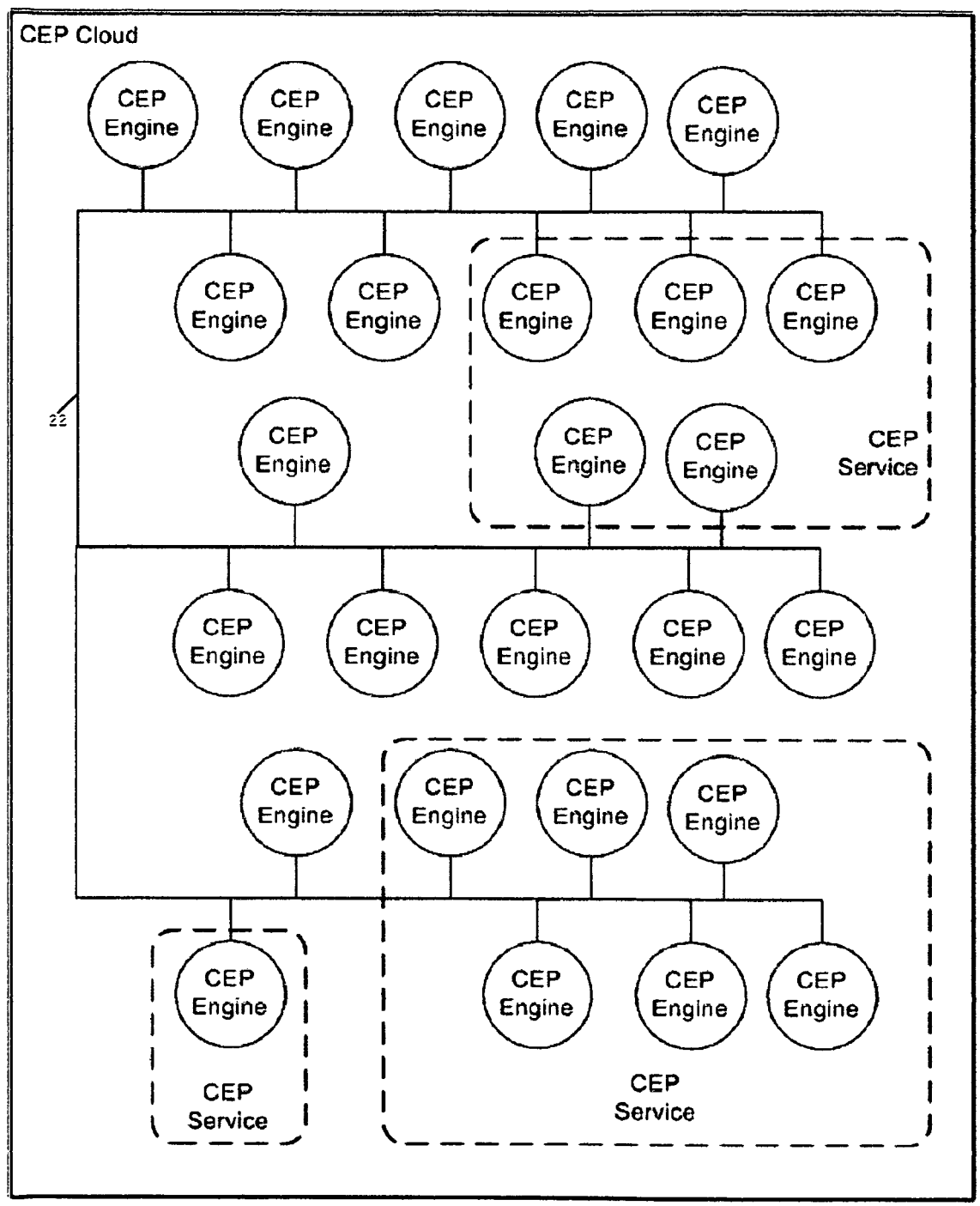
FIG. 2 is a schematic view of a CEP Cloud composed of a network of CEP engines.

The individual compute nodes of the virtual compute utility are capable of running a program that is composed of a CEP Engine. This program is itself either in part or in its entirety a CEP Service 18. FIG. 2 is a view of the composition of the CEP Cloud 16 and its relation to CEP Services.

The definition of a CEP Service 18, as with all other software services is (a) The business function or functions it provides to the user of the service, (b) The input data to the service and output data produced by the service, and (c) The service's effect on other systems or services.

When the implementation of a service requires the use of a CEP Engine then the latter 2 definition parameters of a service take on specific characteristics common to all CEP systems. The data into and produced by a CEP Service 18 are Event Streams 28. A CEP Service 18 effects its environment not only by its output Event Stream but also by taking specific Actions 20 that directly interact with other services and systems.

Figure 7:
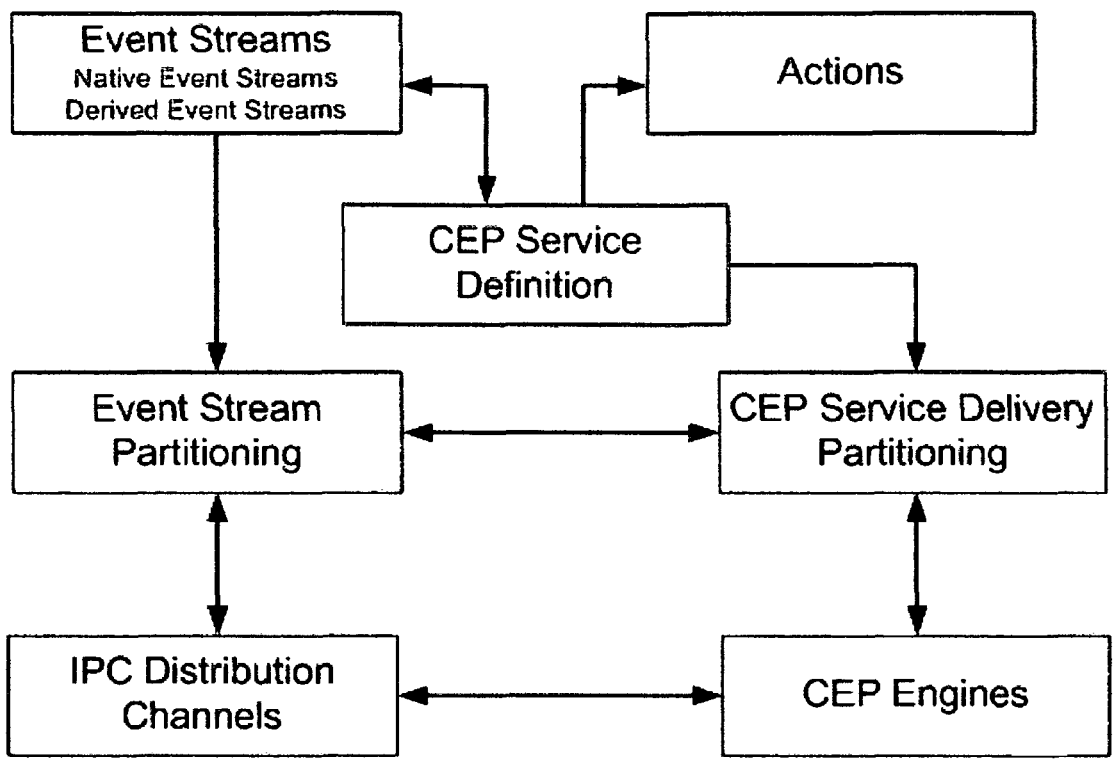
FIG. 7 is a block diagram view of a Interrelationship of CEP Cloud Components.

FIG. 7 shows this relationship in addition to the decomposition and partitioning methods and techniques unique to this invention that enable a CEP Service 18 to be virtualized in the CEP Cloud 16.

The methods and techniques to decompose a CEP Service 18 for virtualization within a CEP Cloud 16 are along the paths of Event Streams 28 and Service Delivery. Event Stream decomposition, involves differentiating "First Tier Event" or Native Events 12 from Derived Events thus creating a system of "n" Tiered Event Streams 28. A useful analogy is the stock market where native instruments are equity instruments such as the physical stock of a company. Derived instruments are equity options that are based on the underlying equity stock but trade independently with their own price, trade volumes, volatility, etc.

Differentiating Native from Derived Event Streams 28 is the first step in partitioning an Event Stream into multiple well defined streams that aid in delivering a partitioned CEP Service 18. Native Events 12 are generated by External Systems 10 to the CEP Cloud 16. Derived Events are not Native Events 12. Typically these are CEP Service 18 and Application level events that add information and context to Native Events 12. The derivation process creating a Derived Event Stream is the result of a Native Event Stream being consumed by one or multiple CEP Services whose output Event Stream is either a modified version of the Native Event Stream or a completely new Event Stream that describes the state or interim state of a CEP Service 18. Note the distinction between Service State and Interim Service State. This method of distinction leads to the decomposition of CEP Service 18 Delivery which will be addressed in detail later in this discussion.

The distinction of Native and Derived Event Streams 28 yields many benefits; first enabling the partitioning (decomposition) of CEP Services into smaller Sub-Functions. These Sub-Functions can be deployed in the CEP Cloud 16 in any fashion that supports and is consistent with the interaction of these Sub-Functions whose end result is the delivery of the overall CEP Service 18.

Benefits of Native and Derived Event Streams 28 are:

(a) Smart use of the network bandwidth that physically composes the CEP Cloud 16. The creation of Derived Event Streams 28 allows for "smarter" better network bandwidth consuming event streams 28 than that of the Native Event Streams 28. FIG. 1 shows the relationship between CEP Services that consume Native Event Streams 28 and produce and consume Derived Event Streams 28.

(b) Enables a CEP Service 18 to be decomposed along any one or combination of ways including: Distinct Service Function 24; Service Sub-Function 26 that describe some Interim Service State; and Deployment of any number of CEP Services, Service Functions, and Service Sub-Function 26.

(c) Enable the physical partitioning of Event Streams 28 within the IPC Protocol of the CEP Cloud 16. This will "target" Event Streams 28 to the CEP Service 18, Service Functions, and Sub-Functions (described above) for more efficient Event Stream Processing and smarter network bandwidth utilization.

All of the afore mentioned benefits of Native and Derived Event Streams 28 set the stage for the creation of virtualized CEP Services in the CEP Cloud 16. The resultant system yields the lowest latent Service delivery possible with the ability to dynamically scale in the CEP Service 18 so to consistently meet the Service Level Agreement (SLA) of the business under any load demand.

CEP Service 18 decomposition and the physical partition of Event Streams 28 are described in the paragraphs to follow.

Partitioning of CEP Services is possible through the application of the methodology and process of this invention and the physical infrastructure to support it. Where the is Methodology; is partitioning of service function 24 and state, that is enabled by the partitioning of Event Streams 28 into Native and Derived Event Streams 28. Where the Physical Infrastructure is an IPC transport to efficiently promote the partitioning of and transport of Event Streams 28 and a Distributed Compute Back Bone to host the CEP Engines that compose the CEP Cloud 16.

The Physical Infrastructure is well known solutions for which a number of implementations can support the parameters required by the methods put forth in this invention. FIG. 2 is a schematic for such an infrastructure. For example purposes only, the following physical infrastructure will be used to describe one possible implementation of the CEP Cloud 16, CEP Services, and Native and Derived Event Streams 28. Specifically, an IPC Protocol and Transport 22 of a Message Oriented Middleware (MOM) and a Compute Grid Middleware (e.g. DataSynapse, Condor, etc.) for CEP Engine deployment across the distributed compute environment. The paragraphs to follow describes the application of the methodology and process of this invention deployed on afore mentioned physical infrastructure.

Figure 3:
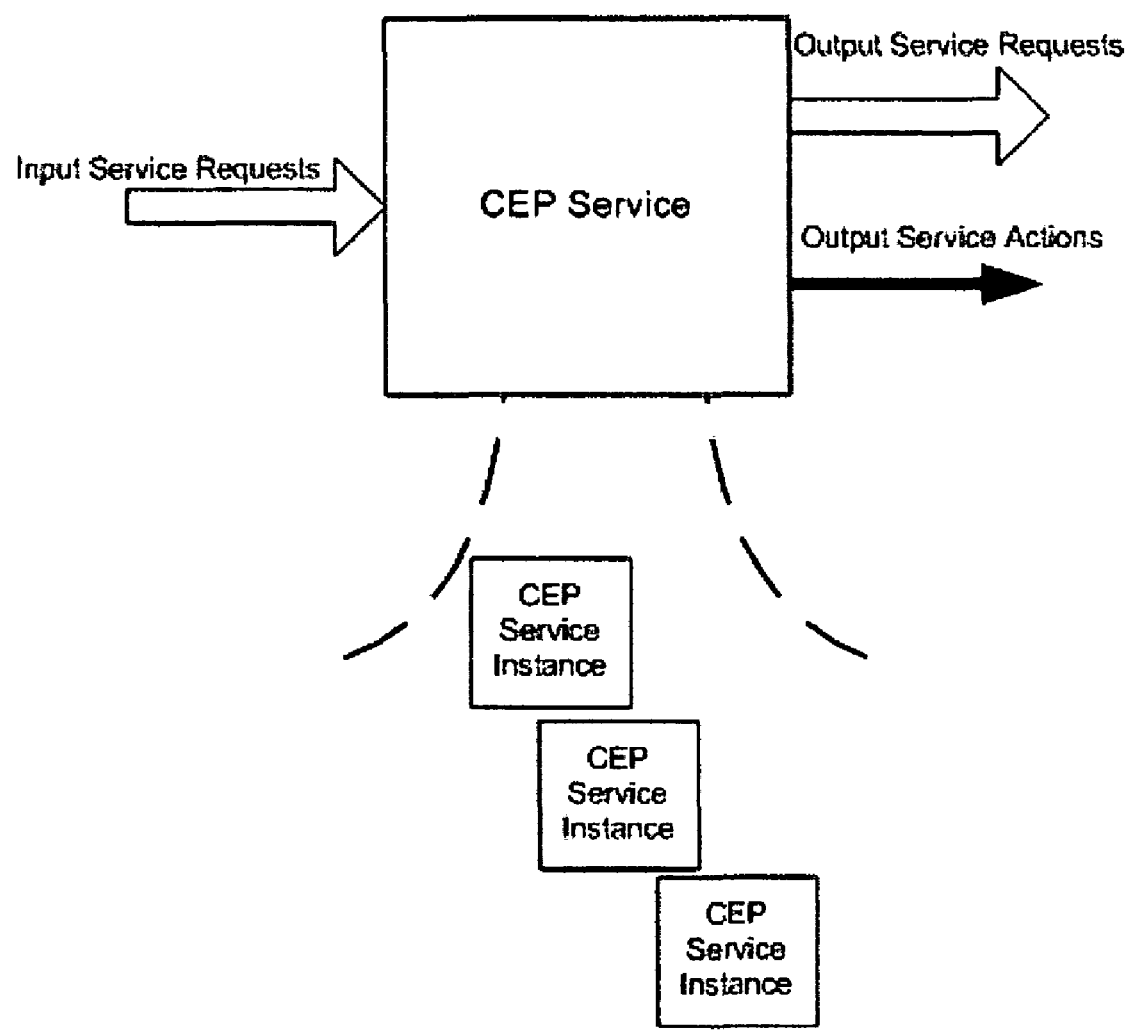
FIG. 3 is a block diagram of a service that is defined by: services or function provided, input service requests: event streams, and output service functions: event streams and actions.
Figure 4:
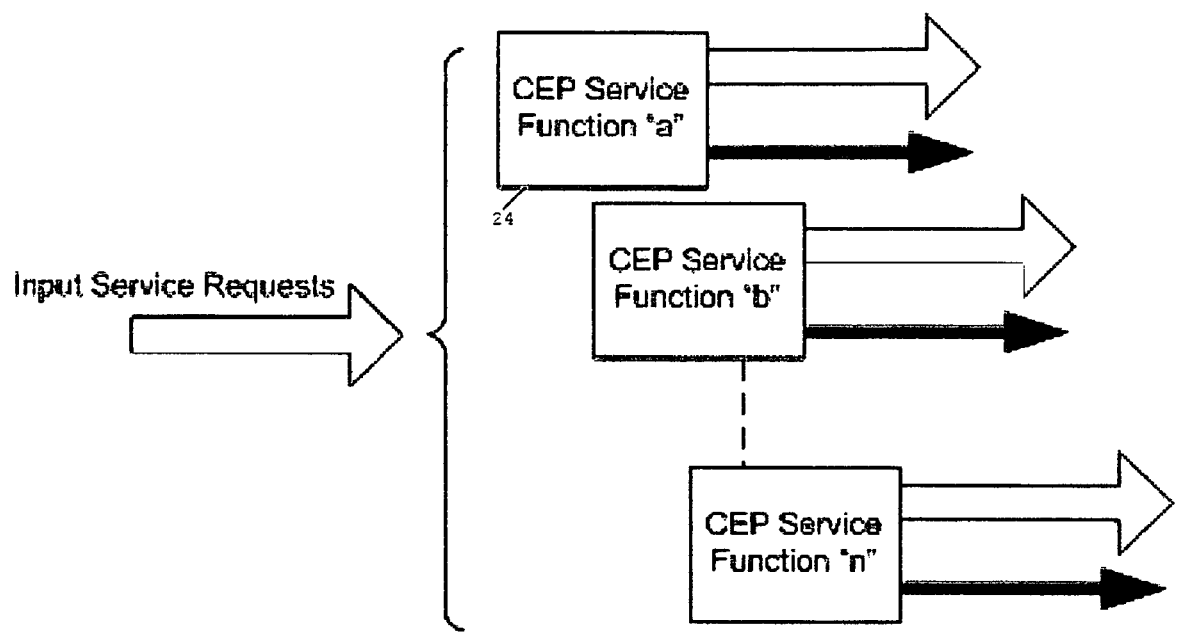
FIG. 4 is a block diagram view of a method of partitioning CEP services into separate autonomous service functions.
Figure 6:
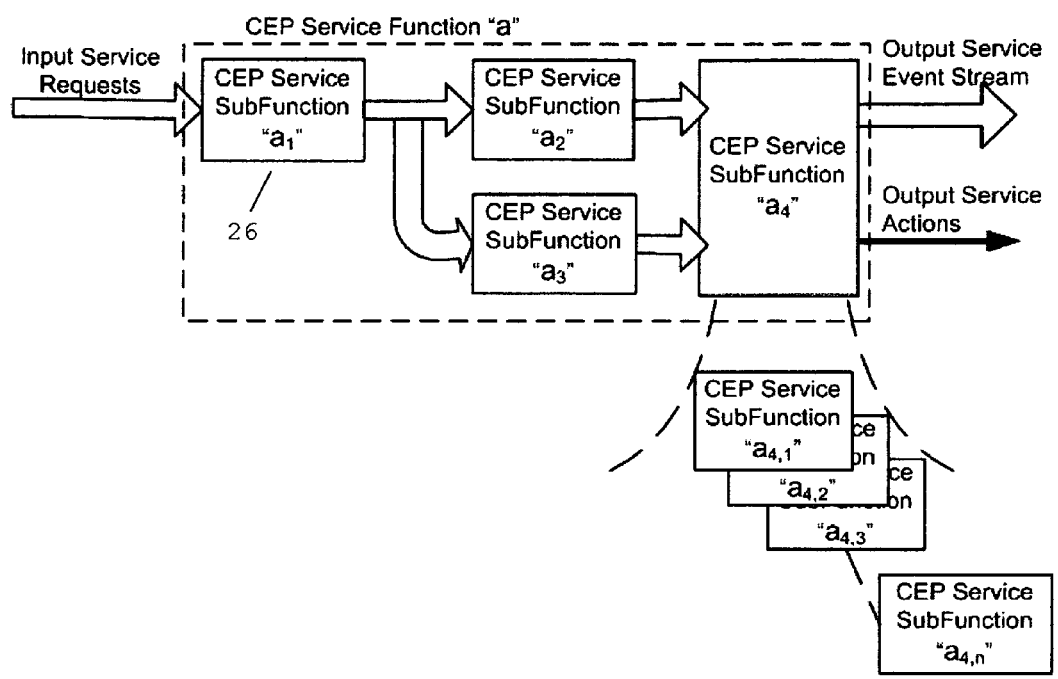
FIG. 6 is a block diagram view of a method of partitioning CEP services such that the complete services are interconnected series, sequences, and correlations of derived event streams and respective functions.

FIG. 7 shows the relationship between service partitioning and event stream partitioning. The optimal performing CEP Service 18 is the proper blend of both service and event stream partitioning. The options for service partitioning are shown in FIG. 3, FIG. 4, and FIG. 6. The simplest is a service that can not be partitioned. FIG. 3 depicts the definition of a CEP Service 18 with its input event stream and its output event streams 28 and actions 20. Also shown are how this service can not be further partitioned where the only deployment options are running one or multiple instances of the same service across the CEP Cloud 16. FIG. 2 shows the deployment of various CEP Services, one of which is a single CEP Service 18 to CEP Engine ratio.

When analyzing a service for possible partitioning, the fundamental parameters are the service providing more than one type of service request (service function 24) and if so are these functions autonomous from each other. If the answer is yes, then the CEP Service 18 can be portioned along service request types or service function 24. FIG. 4 shows such a CEP Service 18 Partitioning.

A further analysis delves into each service function 24 answering the question, can this service function 24 be further decomposed into autonomous tasks that can have interdependencies from each other. Specifically does a service function 24 have its own internal state that can be changed by smaller service sub-functions. FIG. 6 shows how a Service Function 24 can be further partitioned by Service Sub-Function 26. It is important to keep the definition of a CEP Service 18 consistent through out its partitioned components. Each Service Function 24 and their respective Service Sub-Function 26 all maintain the same definition criteria as a CEP Service 18; specifically, a unit of work that operates on an input event stream to produce either or both resultant event streams 28 and actions 20. Maintaining a consistent CEP Service 18 Definition through out its Functions and Sub-Functions enables each component to be distributed and managed within the confines of the CEP Cloud 16.

Interconnecting CEP Services to its partitioned components and the outside community are Event Streams 28. Input event streams 28 are either Native Event Streams 28 or Derived Event Streams 28. Therefore, partitioning a CEP Service 18 can not be done in a vacuum; the event stream definition must be taken into consideration. For example what are the Native and Derived Event Streams 28 and for each what are the through put rates and latency requirements.

Consider a Math CEP Service 18 that has 3 Functions, Functions A, B, and C as shown in FIG. 4. Each of these Service Functions are separate operations the Service provides to the users of the CEP Service 18; for example Function A multiplies numbers of the input event stream, Function B adds numbers of the input event stream, and Function C subtracts numbers of the input event stream. Service Functions B and C can not be partitioned thus they are single instances running in the CEP Cloud 16. Service Function 24 A can be partitioned into Sub-Functions as shown in FIG. 6 and detailed below.

Service Function 24 A can be partitioned in 4 sub-functions a1 through a4. Sub-Functions a1, a2, and a3 are single instances where Sub-Function a4 can further be partitioned into "n" instances. Interconnecting sub-function a1 to a2 and a3 is a derived event stream. Interconnecting sub-function a2 and a3 to a4 are the derived event streams 28 generated by the respective sub-functions a2 and a3. The output event stream of sub-function a4 is the resultant event stream for the entire Service Function 24 "A".

The result is Service Function 24 A that is logically partitioned into 4 parts of which one part is further partitioned thus leading to a physical deployment of 4+"n" CEP Engines interconnected by 3 Derived Event Streams 28.

Figure 5:
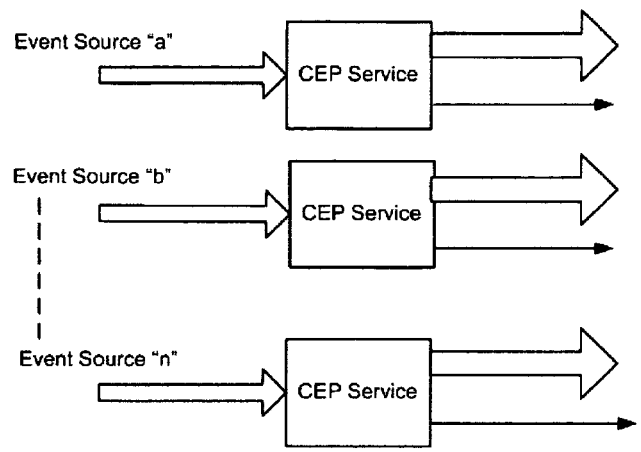
FIG. 5 is a block diagram view of a method of partitioning cep services across input event streams.
Figure 5:
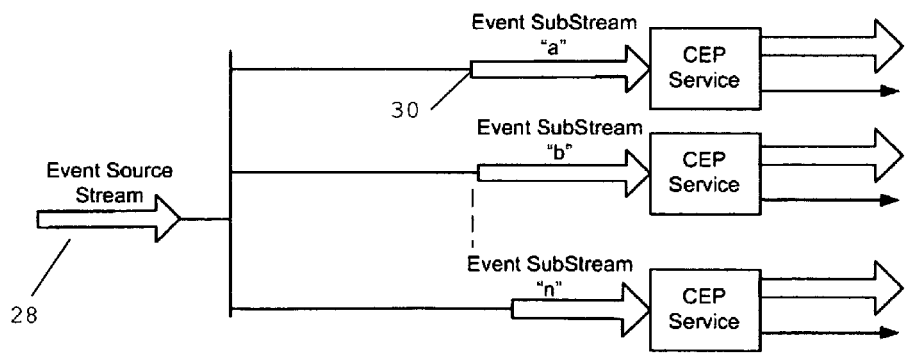

Let us now turn to the partitioning of Event Streams 28. The basic principal is shown in FIG. 5. An Event Stream, Native or Derived can be partitioned into event sub stream 30 or streams. The example above depicts both. The Event Streams 28, Native (input to Service Function 24 A) and Derived are transported between the CEP Engines running the sub-functions is a publish and subscribe messaging middleware. Each event stream is published on its own topic. The sub-functions in turn subscribe to the topics transporting the event streams 28 of interest to that sub-function. Event streams 28 can be partitioned. The derived event stream output by sub-functional is partitioned onto 2 separate topics.

In FIG. 6, sub-functional subscribes to the Native Event Stream published on topic "NES1" and in turn gene-rates and publishes a derived event stream on topics "DESa1.alpha" and 'DESa1.beta'. Sub-function a2 subscribes to event stream "DESa1.alpha" and in turn generates and publishes a derived event stream on topic "DESa23". Sub-function a3 subscribes to event stream "DESa1.beta" and in turn generates and publishes a derived event stream also published on topic "DESa23". Finally sub-function a4 subscribes to derived event stream "DESa23" and turn generates and publishes the final derived event stream, the resultant event stream for this Service Function 24 A, on topic "DESA".

The resultant system is a fully scalable CEP Service deployed in CEP Cloud 16. A Single CEP Service 18 has been decomposed along the paths of Service Function 24 and Event Stream. The process and methodology shown through the use of this example can be applied to any application that leverages a CEP Engine through the decomposition of Service Function 24 and Event Streams 28 whose delivery is supported by the a proper infrastructure. FIG. 7 shows the relationships between the partitioning paths and the supporting infrastructure. FIGS. 3 through 6 shows the paths of Service Function 24 and Event Stream decomposition. FIGS. 1 and 2 show the overall system and schematic of the supporting infrastructure and deployment. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for complex event processing, comprising:

receiving a plurality of complex input event streams, wherein each complex input event stream has a plurality of events that correspond to a plurality of event topics;

using an inter-process communication protocol to communicate the plurality of event topics to at least two complex event processing services;

at each of the at least two complex event processing services, using the inter-process communication protocol to identify at least one of the event topics for processing by the complex event processing service;

at each of the complex event processing services, processing events that correspond to the at least one event topic by:

determining whether a service function provided by the complex event processing service can be partitioned;

if the service function can be partitioned, then generating a sub-function input stream having a plurality of events that correspond to a plurality of sub-function event topics;

using the inter-process communication protocol to communicate the plurality of sub-function event topics to at least two sub-services, wherein each sub-service corresponds to a sub-function;

at each of the at least two sub-services, using the inter-process communication protocol to identify at least one of the sub-function event topics for processing by the sub-service;

at each of the at least two sub-services, processing events corresponding to the at least one sub-function event topic;

generating an output of the complex event processing service based on the processing performed by the at least two sub-services;

if the service function cannot be partitioned, then generating the output of the complex event processing service based on the processing of events that correspond to the at least one event topic; and generating a complex event processing output based on the processing performed by the first and second complex event processing services, wherein a complex event processing output service comprises executing a service action or providing a derived event stream.

2. The method of claim 1, wherein the inter-process communication protocol supports a plurality of complex event processing engines within a distributed computing environment.

3. The method of claim 1, wherein generating an output of the complex event processing service based on the processing performed by the at least two sub-services comprises:
   at each of the at least two sub-services, generating an interim event input stream;
   providing the interim event input streams from each of the at least two sub-services to an interim sub-service; and
   at the interim sub-service, generating an output based on processing the interim event input streams from each of the at least two sub-services.

4. The method of claim 3, wherein providing the interim event input streams from each of the at least two sub-services to an interim sub-service comprises:
   using an inter-process communication protocol to communicate a common input event topic corresponding to the interim event input streams from the at least two sub-services to the interim sub-service; and
   using the inter-process communication protocol at the interim sub-service to identify the common input event topic for processing by the interim sub-service.

5. The method of claim 3, wherein providing the interim event input streams from each of the at least two sub-services to an interim sub-service comprises:
   using an inter-process communication protocol to communicate an input event topic corresponding to each interim event input stream from the at least two sub-services to the interim sub-service; and
   using the inter-process communication protocol at the interim sub-service to identify the input event topics for processing by the interim sub-service.

6. The method of claim 1, wherein generating a complex event processing output based on the processing performed by the first and second complex event processing services comprises:
   at each of the complex event processing services, generating an output derived event stream having a plurality of events that correspond to a common event topic;
   using the inter-process communication protocol to communicate the common event topic to a third complex event processing service;
   using, by the third complex event processing service, the inter-process communication protocol to identify the common event topic for processing by the third complex event processing service;
   at the third complex event processing service, processing events that correspond to the common event topic; and
   generating a complex event processing output based on the processing performed by the third complex event processing service.

7. The method of claim 1, wherein generating a complex event processing output based on the processing performed by the first and second complex event processing services comprises:
   at each of the complex event processing services, generating an output derived event stream having a plurality of events that correspond to an output event topic;
   using the inter-process communication protocol to communicate each of the output event topics to a third complex event processing service;
   using, by the third complex event processing service, the inter-process communication protocol to identify the output event topics for processing by the third complex event processing service;
   at the third complex event processing service, processing events that correspond to each of the output event topics; and
   generating a complex event processing output based on the processing performed by the third complex event processing service.

* * * * *